US008572294B2

(12) United States Patent
Chisholm

(10) Patent No.: US 8,572,294 B2
(45) Date of Patent: Oct. 29, 2013

(54) DEVICE START UP SYSTEM AND METHOD

(75) Inventor: Gordon Chisholm, Perth (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/109,636

(22) Filed: May 17, 2011

(65) Prior Publication Data

US 2012/0297094 A1     Nov. 22, 2012

(51) Int. Cl.
*G06F 9/00*     (2006.01)

(52) U.S. Cl.
USPC ............ 710/10; 710/8; 710/17; 710/104; 713/1; 713/2; 713/100

(58) Field of Classification Search
None
See application file for complete search history.

(56) References Cited

U.S. PATENT DOCUMENTS

| 5,448,719 | A  | * | 9/1995  | Schultz et al. | 714/5.11 |
| 5,815,647 | A  | * | 9/1998  | Buckland et al. | 714/3 |
| 5,978,913 | A  | * | 11/1999 | Broyles et al. | 713/2 |
| 6,434,696 | B1 | * | 8/2002  | Kang | 713/2 |
| 6,671,802 | B1 | * | 12/2003 | Ott | 713/100 |
| 6,718,461 | B1 | * | 4/2004  | Ewertz | 713/1 |
| 6,754,817 | B2 | * | 6/2004  | Khatri et al. | 713/1 |
| 6,883,091 | B2 | * | 4/2005  | Morrison et al. | 713/2 |
| 7,213,139 | B2 | * | 5/2007  | Zhang | 713/1 |
| 7,447,889 | B2 | * | 11/2008 | Cartes et al. | 713/1 |
| 8,296,553 | B2 | * | 10/2012 | Cooper et al. | 713/1 |
| 2004/0006690 | A1 | * | 1/2004 | Du et al. | 713/2 |
| 2004/0215953 | A1 | * | 10/2004 | Cantwell et al. | 713/2 |
| 2004/0221198 | A1 | * | 11/2004 | Vecoven | 714/25 |
| 2006/0018203 | A1 | * | 1/2006 | Kosaka et al. | 369/13.24 |
| 2006/0242396 | A1 | * | 10/2006 | Cartes et al. | 713/1 |
| 2006/0242398 | A1 | * | 10/2006 | Fontijn et al. | 713/2 |
| 2008/0082856 | A1 | * | 4/2008 | French et al. | 714/2 |
| 2010/0125723 | A1 | * | 5/2010 | Cooper et al. | 713/1 |

OTHER PUBLICATIONS

IBM Technical Disclosure Bulletin NN900595, "Power-On Self Testing for Multi-Tasking Personal Computers," May 1990.*
'Computer Post / beep codes' from Computer Hope, archived version from May 3, 2010.*
'Power-on self-test' article from Wikipedia.org, archived version from Feb. 13, 2010.*

* cited by examiner

*Primary Examiner* — Steven Snyder
(74) *Attorney, Agent, or Firm* — Michael Chan

(57) ABSTRACT

Software executes on a processor of a device, such as an automate teller machine, at start-up to perform validation of expected peripheral devices for a predetermined number of start-ups. Once the predetermined number of start-ups has been reached with the same peripheral devices being present and operational the validation operation is curtailed and start-up of the device is sped up.

20 Claims, 3 Drawing Sheets

DEVICE START UP SYSTEM AND METHOD

FIELD OF THE INVENTION

The present invention relates to a device start up system and method. More particularly, but not exclusively, the present invention relates to a device start up system and method in which peripheral device of the device are verified on initial start up and are assumed to be present on subsequent start ups.

BACKGROUND TO THE INVENTION

Upon start up of a self-service terminal, for example an automated teller machine (ATM), each peripheral device that is expected to be present in the ATM, for example a card reader or cash dispenser, undergoes a check routine in order to determine if it is present and if it is functioning correctly. This check routine slows the start up of the ATM down as the start up period of an ATM is a process heavy period with hard disc operations and virus checking etc., being carried out. For example, an ATM with ten peripheral devices start up can take a matter of minutes.

The extended start up period leads to increased downtime of the ATM following, for example routine maintenance, such as cash replenishment, or following a system reboot due to a software glitch, either locally at the ATM or at the operating financial institutions "back office" system. Increased downtime of any self-service terminal, but in particular of ATMs, leads to lost transaction opportunities for the terminal operator, it also leads to customer dissatisfaction for the terminal operator.

Another problem associated with this approach is that if a peripheral device has a fault condition, like a firmware hang, a system reboot and subsequent detection of the device will show it as not present, when it actually is present but in a fault condition. This can result in fault conditions not being detected and the consequent reduction in functionality not being remedied.

SUMMARY OF THE INVENTION

According to a first aspect of the present invention there is provided a device start up system comprising:
a device comprising a processor and a plurality of peripheral devices;
the processor having software installed thereupon, the software being arranged to cause the processor to determine the operational status of each of the peripheral devices upon an initial start up of the device and for a pre-determined number of subsequent start ups of the device thereafter; and
the software being further arranged to cause the processor to initialize the peripheral devices determined to be operational during the initial start up and the pre-determined number of subsequent start ups, omitting determining the operational status of said peripheral devices once the pre-determined number of subsequent start ups of the device has been reached.

Such a system allows for the start up, initialization, of the device without recourse to a lengthy period of determining which peripheral devices are present during the process intensive start up phase.

The software may be further arranged to cause the processor to determine the operational status of each of the peripheral devices a pre-determined time period after start up, once the pre-determined number of subsequent start ups have been reached. The software may be arranged to cause the processor to re-initialize the device if at least one of the peripheral devices is determined to not be operational. The software may be arranged to cause the processor to re-initialize at least one peripheral device if said at least one peripheral device is determined to not be operational.

This allows the presence of the peripheral devices to be determined and remedial action to be taken to restore any peripheral devices found to be non-functional after the process intensive phase of the device start up has been completed.

The number of subsequent start ups may be zero.

The software may be arranged to store configuration data corresponding to peripheral devices discovered during start up of the device on a data storage device associated with the device. The software may be arranged to store start up count date with the configuration data on the data storage device. The software may be arranged to store configuration data on the data storage device after each of the pre-determined number of start ups. The software may be arranged to store final configuration data on the data storage device the final configuration data, corresponding to a preferred set of peripheral devices upon completion of the last of the pre-determined number of start ups.

The device may comprise any one of the following: an ATM, an information kiosk, an electronic funds transfer (EFT) terminal a financial services centre, a bill payment kiosk, a video, DVD, multi-media, mpeg3 etc sales/rental kiosk, a lottery kiosk, a postal services machine, a check-in and/or check-out terminal such as those used in the retail, hotel, car rental, gaming, healthcare, and airline industries According to a second aspect of the present invention there is provided software, which when executed upon a processor of a device, causes the processor to determine the operational status of each of a plurality of peripheral devices upon an initial start up of the device and for a pre-determined number of subsequent start ups of the device thereafter; and the software being further arranged to cause the processor to initialize the peripheral devices determined to be operational during the initial start up and the pre-determined number of subsequent start ups, omitting determining the operational status of said peripheral devices once the pre-determined number of subsequent start ups of the device has been reached.

The software may be further arranged to cause the processor to determine the operational status of each of the peripheral devices a pre-determined time period after start up, once the pre-determined number of subsequent start ups have been reached. The software may be arranged to cause the processor to re-initialize the device if at least one of the peripheral devices is determined to not be operational. The software may be arranged to cause the processor to re-initialize at least one peripheral device if said at least one peripheral device is determined to not be operational.

The software may be arranged to store configuration data corresponding to peripheral devices discovered during start up of the device on a data storage device associated with the device. The software may be arranged to store start up count date with the configuration data on the data storage device. The software may be arranged to store configuration data on the data storage device after each of the pre-determined number of start ups. The software may be arranged to store final configuration data on the data storage device the final configuration data, corresponding to a preferred set of peripheral devices upon completion of the last of the pre-determined number of start ups.

According to a third aspect of the present invention there is provided a method of reducing the start-up time of a device comprising the steps of:

determining the operational status of each of a plurality of peripheral devices upon an initial start up of the device and for a pre-determined number of subsequent start ups of the device thereafter at a processor of the device; and causing the processor to initialize the peripheral devices determined to be operational during the initial start up and the pre-determined number of subsequent start ups, omitting determining the operational status of said peripheral devices once the pre-determined number of subsequent start ups of the device has been reached.

The method may further comprise determining the operational status of each of the peripheral devices a pre-determined time period after start up, once the pre-determined number of subsequent start ups have been reached. The method may comprise re-initializing the device if at least one of the peripheral devices is determined to not be operational. The method may further comprise cause re-initializing at least one peripheral device if said at least one peripheral device is determined to not be operational.

The method may comprise storing configuration data corresponding to peripheral devices discovered during start up of the device on a data storage device associated with the device. The method may comprise storing start up count date with the configuration data on the data storage device. The method may comprise storing configuration data on the data storage device after each of the pre-determined number of start ups. The method may comprise storing final configuration data on the data storage device the final configuration data, corresponding to a preferred set of peripheral devices upon completion of the last of the pre-determined number of start ups.

According to a fourth aspect of the present invention there is provided a device start up program for executing on a processor to which a plurality of peripheral devices may be connected, the program being operable:

(i) to determine which peripheral devices are operational on:
 (a) initial start up of the program and
 (b) a pre-determined number of subsequent start ups of the program thereafter;
(ii) to initialize those peripheral devices determined to be operational during the initial start up and the pre-determined number of subsequent start ups;
(iii) in the event that the same peripheral devices are determined to be operational during initial start up and the pre-determined number of subsequent start ups, to set a configuration comprising those peripheral devices; and
(iv) on a start up after the pre-determined number of subsequent start ups, to initialize the configuration without determining which peripheral devices are operational.

According to a fifth aspect of the present invention there is provided processor executing the program of the fourth aspect of the present invention According to a sixth aspect of the present invention there is provided a system including the processor of the fifth aspect of the present invention and further comprising a plurality of peripherals connected thereto.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
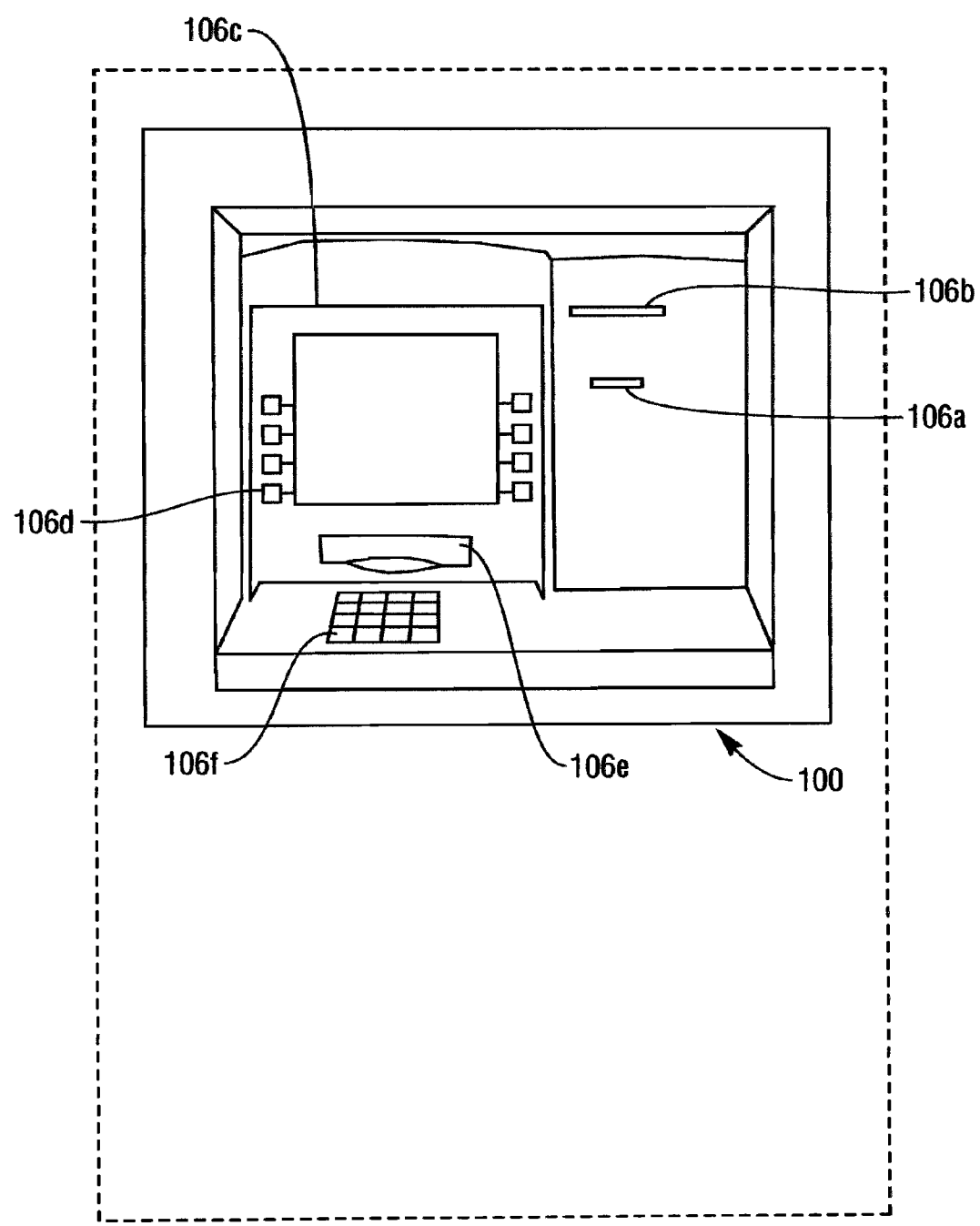
FIG. 1 is a front elevational view of an automated teller machine (ATM) according to an aspect of the present invention.
Figure 2:
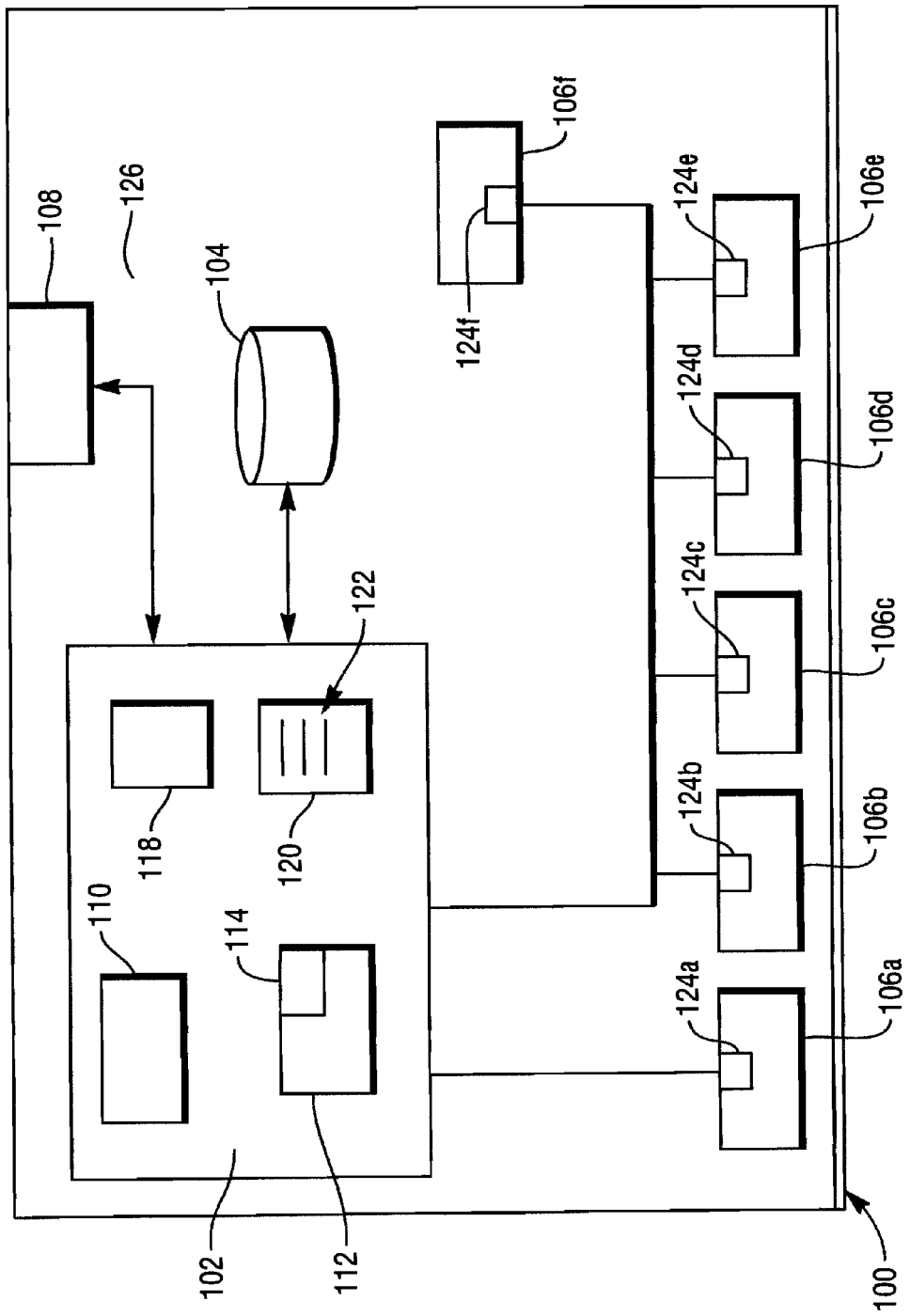
FIG. 2 is a schematic view of selected internal elements of the ATM of FIG. 1.

Referring now to FIGS. 1 and 2, an automated teller machine (ATM) 100 comprises a controller 102, a data storage device 104, a number of peripheral devices 106a-f, and a network connection 108. Typically, the control processor 102 is a PC core operating under a Microsoft Windows™ operating system. Normally, the data storage device 104 is a magnetic disc and may form part of the controller in some embodiments.

The controller 102 is typically a PC core running the Microsoft® Windows XP® system. The controller 102 comprises a BIOS 110 stored in non-volatile memory, a microprocessor 112 and associated main memory 114.

Typical peripheral devices found in the ATM 100 comprise, but are not limited to, a card reader device 106a, a receipt printer device 106b, a display 106c and associated function display keys (FDKs) 106d, a dispenser device 106e and an encrypting keypad 106f.

The ATM 100 connects to a communications network (not shown) comprising a secure network over which transactions data for transactions executed at the ATM 100 passes to an authorisation host (not shown).

In use, the controller 102 loads an operating system kernel 118 and an ATM application program 120, for example the APTRA XFS platform available form NCR Corporation of Duluth, Ga., into the main memory 114. The ATM application program 120 acts as an API mediating communications between the controller 102 and the peripheral devices 106a-f.

The application program 120 comprises a suite of routines and objects 122 for controlling the operation of the ATM 100 such as providing the sequence of screens used in each transaction. The application program 120 also comprises a number of service providers 124a-f, in the case of APRTA XFS these will be CEN XFS service providers. The service providers 124 control at least one, possibly many, of the peripheral devices 106a-f, and/or applications running on the ATM 100. The service providers 124a-f drive requests from the controller 102 to the peripheral devices 106a-f For example the service provider 124f relates to the encrypting keypad 106f drives requests for both an encryptor device and a keyboard device that comprise the keypad 106f.

Typically, the driving of requests involves translating any proprietary communications, command data and/or response data required to drive the peripheral device 106a-f and monitor its performance. In an exemplary embodiment utilising the CEN XFS standard, the standard defines a programming standard for communicating with each individual class of CEN XFS service provider 124a-f, such that expected requests, excepted responses and events associated with each service provider 124a-f are defined.

The controller 102 contains a database listing those peripheral devices which it expects to be present on start-up. On the first start-up of the ATM 100 the controller 102 carries out a handshake routine with each of the peripheral devices 106a-f in order to determine that they are both physically present and operational. The manner of handshake routines are standard for determining the presence and operational status of peripheral devices on start-up of ATMs and will be known to those in the art. The controller 102 is configured to carry out such a "soft" start-up a predetermined number of times, for example for the first three start-ups of the ATM 100. If, following the pre-determined number of start-ups all of the expected peripheral devices 106a-f are present the list of expected peripheral devices 106a-f in the database is hardened, and the peripheral devices 106a-f are subsequently assumed to be physically present and operational on start-up and the handshake routines are omitted at the ATM 100 start-up. This allows the ATM 100 to be in an operational state more quickly than is currently the case.

In a preferred embodiment, the handshake routines between the controller 102 and the peripheral devices 106a-f are merely delayed for a pre-determined period, typically of the order of a five minutes, such that the computationally intensive period of start-up where, for example, virus checking and disc operations are carried out is complete. This preferred embodiment allows the quick start-up of the ATM 100 coupled with an accurate knowledge of which peripheral devices 106a-f are operational on the ATM 100. If a peripheral device 106a-f is found to be not operational the controller 102 enters the details in a log and may, in certain embodiments, instigate a call to a remote maintenance operations centre from which a customer service engineer can be dispatched to deal with the faulty peripheral device.

Upon addition of a new peripheral device it is necessary for the ATM 100 to register the new device and trigger a reboot to revert back to discovering each peripheral device upon start-up with a handshake routine. This can be achieved in a number of ways, for example, a check of the universal serial bus (USB) vendor identifiers (VID) or product identifiers (PIDs) registered at the controller during the start-up of the ATM 100. The presence of any new VID or PID triggers a reboot of the ATM 100 followed by a full re-discovery of peripheral devices 106a-f present on the ATM 100. The ATM 100 is again required to undergo a predetermined number of "soft" start-ups in which all peripheral devices 112a-f are discovered via handshake routines. Once the predetermined number of "soft" start-ups have been carried out and a "hard" list of peripheral devices 106a-f present on the ATM 100 established, the ATM 100 reverts to the start-up routine noted hereinbefore in which the handshake routines are either delayed or dispensed with.

One alternative approach to detecting the addition of peripheral devices to the ATM 100 is via the monitoring of software installation. The controller 102 monitors installer activity and if any new software installation occurs the controller 102 triggers a reboot of the ATM 100 followed by a full re-discovery of peripheral devices 106a-f present on the ATM 100. The ATM 100 is again required to undergo a predetermined number of "soft" start-ups in which all peripheral devices 106a-f are discovered via handshake routines. Once the predetermined number of "soft" start-ups have been carried out and a "hard" list of peripheral devices 106a-f present on the ATM 100 established, the ATM 100 reverts to the start-up routine noted hereinbefore in which the handshake routines are either delayed or dispensed with.

It is possible that the either the system application or a supervisor application may be configured to allow manual rebooting and resetting of the ATM 100 to a "soft" start-up routine to provide a backup to manually override the automatic device addition routines.

It will be appreciated that the foregoing methods of monitoring for the addition of a new peripheral device are exemplary only and additional and/or alternative methods of new peripheral device discovery are possible.

If a peripheral device 106a-f is removed from the ATM 100a communications fault is logged with the systems application and a customer service engineer will be dispatched to deal with the fault. In one embodiment, the customer service engineer will be prompted to confirm that the peripheral device 106a-f has been removed from the ATM 100. If the customer service engineer confirms the removal of the peripheral device 106a-f from the ATM 100, the controller 102 triggers a reboot of the ATM 100 followed by a full re-discovery of peripheral devices 106a-f present on the ATM 100. The ATM 100 is again required to undergo a predetermined number of "soft" start-ups in which all peripheral devices 106a-f are discovered via handshake routines. Once the predetermined number of "soft" start-ups have been carried out and a "hard" list of peripheral devices 106a-f present on the ATM 100 established, the ATM 100 reverts to the start-up routine noted hereinbefore in which the handshake routines are either delayed or dispensed with.

Figure 3:
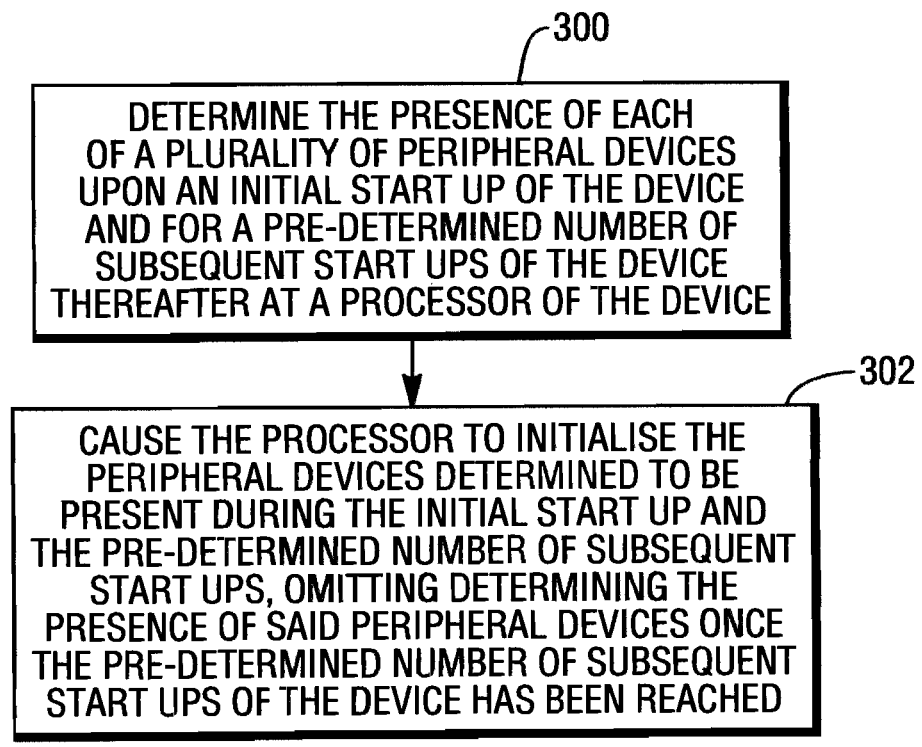
FIG. 3 is a flowchart detailing a method of reducing the start-up time of a device according to another aspect of the present invention.

Referring now to FIG. 3, a method of reducing the start-up time of a device, for example an ATM, comprises determining the operational status of each of a plurality of peripheral devices upon an initial start up of the device and for a pre-determined number of subsequent start ups of the device thereafter at a processor of the device (Step 300). The processor initializes the peripheral devices determined to be operational during the initial start up and the pre-determined number of subsequent start ups, omitting determining the operational status of said peripheral devices once the pre-determined number of subsequent start ups of the device has been reached (Step 302).

It will be appreciated that, although the present invention is described with reference to an ATM, the present invention is applicable to the following, non-limiting, examples of devices: an information kiosk, an electronic funds transfer (EFT) terminal a financial services centre, a bill payment kiosk, a video, DVD, multi-media, mpeg3 etc sales/rental kiosk, a lottery kiosk, a postal services machine, a check-in and/or check-out terminal such as those used in the retail, hotel, car rental, gaming, healthcare, and airline industries, or the like.

It will also be appreciated that the steps of the methods described herein may be carried out in any suitable order, or simultaneously where appropriate. The methods described herein may be performed by software in machine readable form on a tangible storage medium or as a propagating signal.

Typically, the peripheral device implements its function either in response to a customer action and/or a command received from a PC core (which is also a peripheral device) of the device. Non-limiting examples of peripheral devices include: display, card reader, journal printer, rear operator panel, encrypting keypad, PC core, cash dispenser etc.

Typically, each peripheral device comprises a processor to enable the peripheral device to perform its function, and a communications facility to enable the peripheral device to communicate with the controller, but in some instances this may not be essential.

Each peripheral device comprises one or more components that contribute to the execution of the peripheral device's respective function. Typically, each component comprises a replaceable part within the module. Non-limiting examples of components include: for the display module, a display panel, a display panel housing, and the like; for a cash dispense module, a note thickness sensor, a pick unit, a presenter unit, and the like.

Each component comprises one or more parts configured to enable the device to contribute to the execution of the peripheral device's function. Non-limiting examples of parts include: for a motorised card reader module, a width switch, a shutter, a pre-read magnetic head, a magnetic stripe reading head, and the like.

Various modifications may be made to the above described embodiments without departing from the spirit and the scope of the invention.

The invention claimed is:

1. A device start up system comprising:
   a plurality of peripheral devices;
   a processor having (i) a loaded operating system, and (ii) software installed thereupon;
   the software being arranged to cause the processor to determine the operational status of each of the peripheral devices upon an initial start up of the device and for a pre-determined number of at least one subsequent start up of the device after the initial start up of the device;
   the software being further arranged to cause the processor to initialize the peripheral devices determined to be operational during the initial start up and during the pre-determined number of at least one subsequent start up; and
   the software being further arranged to cause the processor to omit determining the operational status of said peripheral devices after the initial start up has occurred and the pre-determined number of at least one subsequent start up of the device has been reached.

2. The system of claim 1, wherein the software is arranged to cause the processor to determine the operational status of each of the peripheral devices a pre-determined time period after the initial start up and the pre-determined number of at least one subsequent start up has been reached.

3. The system of claim 1, wherein the software is arranged to cause the processor to re-initialize the device if at least one of the peripheral devices is determined to not be operational.

4. The system of claim 1, wherein the software is arranged to cause the processor to re-initialize at least one peripheral device if said at least one peripheral device is determined to not be operational.

5. The system of claim 1, wherein the software is arranged to store configuration data corresponding to peripheral devices discovered during start up of the device on a data storage device associated with the device.

6. The system of claim 5, wherein the software is arranged to store start up count date with the configuration data on the data storage device.

7. The system of claim 1, wherein the software is arranged to store configuration data on the data storage device after each of the pre-determined number of at least one subsequent start up.

8. The system of claim 7, wherein the software is arranged to store final configuration data on the data storage device, the final configuration data, corresponding to a preferred set of peripheral devices upon completion of the last of the pre-determined number of at least one subsequent start up.

9. The system of claim 1, wherein the device comprises any one of the following: an automatic teller machine (ATM), an information kiosk, an electronic funds transfer (EFT) terminal, a financial services center, a bill payment kiosk, a sales/rental kiosk, a lottery kiosk, a postal services machine, a check-in and/or check-out terminal such as those used in the retail, hotel, car rental, gaming, healthcare, and airline industries.

10. A non-transitory computer readable storage medium including software which, when executed upon a processor having a loaded operating system, causes
    (i) the processor to determine the operational status of each of a plurality of peripheral devices upon an initial start up of the device and for a pre-determined number of at least one subsequent start up of the device after the initial start up of the device;
    (ii) the processor to initialize the peripheral devices determined to be operational during the initial start up and during the pre-determined number of at least one subsequent start up; and
    (iii) the processor to omit determining the operational status of said peripheral devices after the initial start up has occurred and the pre-determined number of at least one subsequent start up of the device has been reached.

11. A non-transitory computer readable storage medium including software according to claim which, when executed, causes the processor to determine the operational status of each of the peripheral devices a pre-determined time period after the initial start up and the pre-determined number of at least one subsequent start up has been reached.

12. A non-transitory computer readable storage medium including software according to claim 10 which, when executed, causes the processor to re-initialize the device if at least one of the peripheral devices is determined to not be operational.

13. A non-transitory computer readable storage medium including software according to claim 10 which, when executed, causes the processor to re-initialize at least one peripheral device if said at least one peripheral device is determined to not be operational.

14. A non-transitory computer readable storage medium including software according to claim 10 which is arranged to store configuration data corresponding to peripheral devices discovered during start up of the device on a data storage device associated with the device.

15. A non-transitory computer readable storage medium including software according to claim 14 which is arranged to store start up count date with the configuration data on the data storage device.

16. A non-transitory computer readable storage medium including software according to claim 10 which is arranged to store configuration data on the data storage device after each of the pre-determined number of at least one subsequent start up.

17. A non-transitory computer readable storage medium including software according to claim 16 which is arranged to store final configuration data on the data storage device, the final configuration data, corresponding to a preferred set of peripheral devices upon completion of the last of the pre-determined number of at least one subsequent start up.

18. A method of operating a processor having a loaded operating system to reduce start-up time of a device, the method comprising the steps of:
    determining the operational status of each of a plurality of peripheral devices upon an initial start up of the device and for a pre-determined number of at least one subsequent start up of the device after the initial start up of the device;
    causing the processor to initialize the peripheral devices determined to be operational during the initial start up and during the pre-determined number of at least one subsequent start up; and
    causing the processor to omit determining the operational status of said peripheral devices after the initial start up has occurred and the pre-determined number of at least one subsequent start up of the device has been reached.

19. The method of claim 18 further comprising determining the operational status of each of the peripheral devices a pre-determined time period after start up, once the pre-determined number of at least one subsequent start up has been reached.

20. The method of claim 18, wherein the device comprises any one of the following: an automated teller machine (ATM), an information kiosk, an electronic funds transfer (EFT) terminal, a financial services center, a bill payment kiosk, a sales/rental kiosk, a lottery kiosk, a postal services machine, a check-in and/or check-out terminal such as those used in the retail, hotel, car rental, gaming, healthcare, and airline industries.

* * * * *